J. STERN & W. MEYN.
Sheet-Metal Elbow.

No. 210,367.  Patented Nov. 26, 1878.

Attest:
H. L. Aulls
David Patterson

Inventors.
John Stern
William Meyn
per Attorney, H. F. Oberts.

UNITED STATES PATENT OFFICE.

JOHN STERN AND WILLIAM MEYN, OF DETROIT, MICHIGAN, ASSIGNORS OF ONE-THIRD THEIR RIGHT TO EDWARD W. STODDARD, OF SAME PLACE.

IMPROVEMENT IN SHEET-METAL ELBOWS.

Specification forming part of Letters Patent No. 210,367, dated November 26, 1878; application filed September 26, 1878.

*To all whom it may concern:*

Be it known that we, JOHN STERN and WILLIAM MEYN, of Detroit, in the county of Wayne and State of Michigan, have invented a new and useful Improvement in Sheet-Metal Elbows, of which the following is a specification:

The nature of our invention relates to an improvement in that class of sheet-metal elbows which are formed by a succession of ungula-shaped sections of a cylinder, joined together at their ends; and it relates more particularly to the manner of joining the sections together.

The object we have in view is to so form the joints that they will not come apart in handling or fitting the elbow, and will have no unsightly external projections to catch dust.

Figure 1:
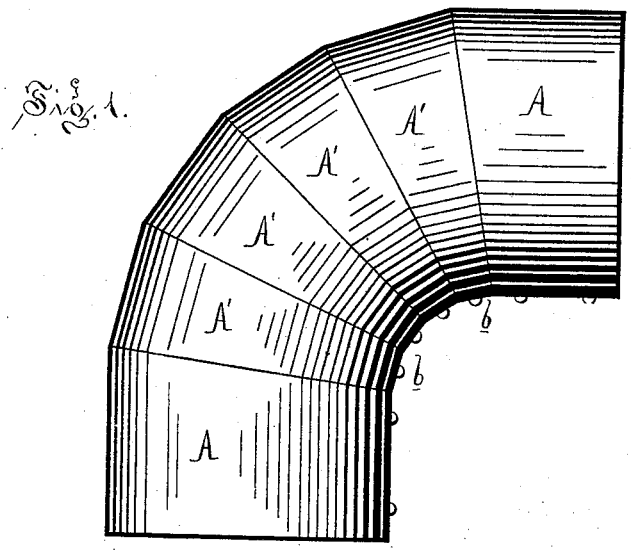
Figure 2:
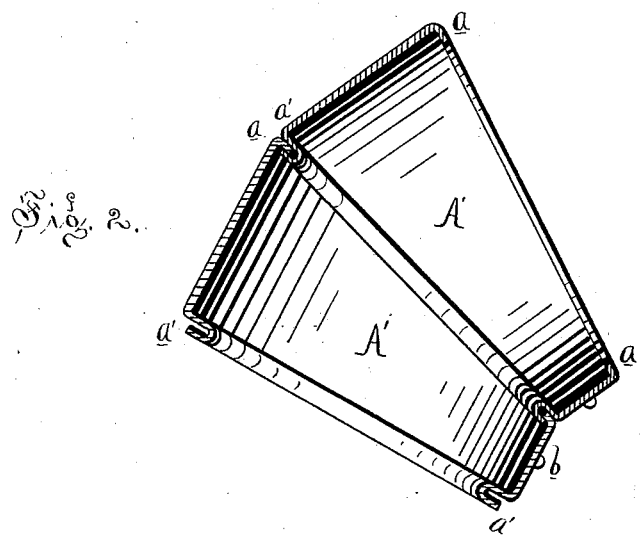

Figure 1 is a side elevation of our elbow. Fig. 2 is a longitudinal section of a portion of the same, showing the manner of joining the sections together.

In the drawing, A A represent the end sections of our elbow, which is made up with intermediate ungula-shaped sections A'. These sections are connected with one another by internal flange-joints, formed by turning an internal flange, $a$, at one end of each section, and at the other end an internal reverted or double flange, $a'$, as seen in Fig. 2.

The flanges are turned while the sections are flat, and the latter may be, in the same operation, curved into the circular form, after which their narrow ends are overlapped and fastened by a single rivet, $b$. The sections are then joined by springing the female flanges $a'$ over the male flanges $a$, and are fastened by squeezing them laterally together in a machine specially designed for that purpose.

The joints so made are much stronger and stiffer than other constructions, while the smooth outer surface of the elbow is thought to be more perfect in its appearance from the absence of external projections, which serve as lodging-places for dust to settle on.

We are aware that a stove-pipe elbow has before been constructed in sections substantially of ungula shape, with curved instead of straight surfaces, such sections being joined by external flanges; and we are also aware that joints made by fitting together male and female flanges have been long used in sheet-metal working. We therefore neither claim, broadly, a stove-pipe elbow made of ungula-shaped sections, nor a sheet-metal joint composed of male and female flanges.

What we claim as our invention is—

The herein-described sheet-metal elbow, whose ungula-shaped sections are jointed together by the internal male and female flanges, $a\ a'$, substantially as set forth.

JOHN STERN.
WILLIAM MEYN.

Witnesses:
W. AMBRIDGE,
GEORGE COLLIER.